United States Patent
Walter et al.

(12) 
(10) Patent No.: US 6,314,214 B1
(45) Date of Patent: Nov. 6, 2001

(54) SYSTEM AND METHOD FOR MEASURING STRESS DURING PROCESSING OF AN OPTICAL FIBER

(75) Inventors: Donald J. Walter, Painted Post; Donald J. Wissuchek, Jr., Horseheads, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/407,579

(22) Filed: Sep. 28, 1999

(51) Int. Cl.[7] ................................................. G02B 6/00
(52) U.S. Cl. ........................................ 385/13; 385/12
(58) Field of Search .................. 385/13, 12; 250/227.14, 250/227.18, 227.21, 227.25, 900; 356/32

(56) References Cited

U.S. PATENT DOCUMENTS

| | | | |
|---|---|---|---|
| 4,734,577 | 3/1988 | Szuchy | 250/227 |
| 4,873,989 | 10/1989 | Einzig | 128/692 |
| 5,001,337 | 3/1991 | Homuth | 250/227.19 |
| 5,164,605 * | 11/1992 | Kidwell | 250/577 |
| 5,452,087 | 9/1995 | Taylor et al. | 356/352 |
| 5,493,390 | 2/1996 | Varasi et al. | 356/32 |
| 5,557,406 | 9/1996 | Taylor et al. | 356/345 |
| 5,684,297 | 11/1997 | Tardy | 250/227.14 |
| 5,714,680 | 2/1998 | Taylor et al. | 73/37 |
| 5,729,335 | 3/1998 | Green | 356/73.1 |
| 5,814,365 * | 9/1998 | Mahawili | 427/10 |
| 5,828,059 | 10/1998 | Udd | 250/227.18 |
| 5,889,901 | 3/1999 | Anderson et al. | 385/12 |
| 5,909,273 | 6/1999 | Malvern | 356/35.5 |

OTHER PUBLICATIONS

Patent Abstracts of Japan, JP 09 079,827, Mar. 28, 1997.

* cited by examiner

*Primary Examiner*—Mohammad Sikder
(74) *Attorney, Agent, or Firm*—William J. Chervenak

(57) ABSTRACT

A system and method for measuring stress exerted on an optical fiber including providing an optical fiber that includes a fiber optic sensor, and exposing the optical fiber and the fiber optic sensor to various stresses associated with the process by moving the optical fiber and the fiber optic sensor through the process to be measured. The system and method further includes transmitting a source light through the optical fiber as the optical fiber and the fiber optic sensor are exposed to various stresses, receiving a return light signal from the fiber optic sensor as the optical fiber and the fiber optic sensor are exposed to various stresses, and comparing the source light signal to the return light signal for determining the stress exerted on the optical fiber.

12 Claims, 4 Drawing Sheets

SYSTEM AND METHOD FOR MEASURING STRESS DURING PROCESSING OF AN OPTICAL FIBER

BACKGROUND OF THE INVENTION

1. Field of the Invention

The present invention relates to a method for measuring stress exerted on an optical fiber, and in particular to a method for measuring stresses exerted on an optical fiber during manufacturing of the fiber or of a cabled fiber.

2. Technical Background

Numerous forms of fiber optic sensors have been developed to monitor parameters in various systems and processes, including the Fabry-Perot Interferometer, the Bragg Grating, the Mach-Zehnder Interferometer, and the Michelson Interferometer, to name but a few. These fiber optic sensors are used in a wide variety of applications, including use as strain gauges, dynamic pressure sensors, bearing condition sensors, non-contact proximity sensors, and temperature sensors. In each of these applications, the fiber optic sensor is fixedly attached to the system to be monitored, and usually is encased within a housing or rigid structure that is fixedly attached to the system to communicate parameter changes in the system to the fiber optic sensor.

As strain gauges, fiber optic sensors have been used to monitor dynamic strain. In such applications, the fiber optic sensor is imbedded within a material that is attached to a component of a structure such that the strain within the component may be monitored. Applications of fiber optic strain gauges have typically included civil structures such as dams, buildings, and bridges.

As dynamic pressure sensors, fiber optic sensors have been used in a variety of applications including the monitoring of performance of internal combustion engines, as well as monitoring the performance of compressors and pumps. When used to monitor the performance of an internal combustion engine, the fiber optic sensor is typically placed within a housing mated with a cylinder of the engine. The housing typically has a metal diaphragm that is attached to one end of the fiber optic sensor. Pressures exerted on the diaphragm are transferred to the fiber optic sensor, thereby changing the overall length of the sensor and allowing measurement of continuous real-time in cylinder pressures permitting improved engine control, providing preventive maintenance data, and predictive emissions monitoring. When used to monitor the performance of compressors and pumps, the fiber optic sensor is imbedded within an aluminum alloy rod, or similar metal, by an encasing process. The aluminum rod encasing the fiber optic sensor is then placed within a metal housing having a diaphragm similar to that described above in relation to engine monitoring. By placing the diaphragm in contact with the fluid being transferred by the compressor and/or pump, measurements of cavitation, flow instability, and surge detection are possible, thereby reducing the risk of catastrophic mechanical failure.

As bearing condition sensors, fiber optic sensors are used to monitor the condition of bearing or rotor imbalance. Typically, the fiber optic sensor is encased within a housing that includes a deformable diaphragm. The fiber optic sensor is in contact with the diaphragm which is, in turn, in contact with the outer race of a bearing, thereby allowing for the transfer of any vibrations between the associated bearings and the outer race to the fiber optic sensor.

In non-contact proximity sensors, fiber optic sensors are used to measure shaft vibration, rotor trust position, shaft rotational speed, as well as rotor imbalance and misalignment. In these applications, the fiber optic sensor is encased within a steel rod having a magnet attached to an end thereof. The steel rod encasing the optical fiber and the magnet are positioned within a stationary housing. The housing is then located such that the magnet is in close proximity to the rotating shaft to be monitored. Imbalances in the shaft cause the magnet to move which motion is transferred to the optical sensor for monitoring of the position or condition of the shaft.

As temperature sensors, fiber optic sensors are typically inserted into areas desired to be monitored, or imbedded into cast parts, thereby allowing the direct measurement of temperatures therein.

Typically, fiber optic sensors have been used to monitor systems that allow for stationary or fixed placement of the sensor within the system. The construction of these sensors have made it difficult if not impossible to monitor processes, systems, or machines that require the optical fiber and the associated fiber optic sensor to be moved throughout the system being monitored. Further, these systems typically require the fiber optic sensor to be cast within a part or structure to be monitored, or placed within a housing that is attached directly to the system to be monitored, thereby adding to the size and cost associated with the monitor system.

The manufacturing procedures and processing of optical fibers and fiber optic cables are numerous and varied. Many of these processes include placing a stress on the optical fiber or fibers being processed. These stresses when applied over time, however short, result in sub-critical growth of the pre-existing flaws located within the optical fibers, thereby decreasing the overall strength of the optical fiber. In certain applications, it is important that the optical fiber, or bundle of fibers, has sufficient strength to withstand loads place thereon without damaging the optical fiber or overall fiber optic cable. As a result, reliability models are created to estimate the strength of the fiber and the associated fiber optic cables after the processing and manufacturing. Reliability models for optical fibers are based on three things: the size distribution of flaws or cracks within the fiber; fatigue crack growth parameters; and the stress-time profile which the fiber experiences during processing. High-stress processing events may result in degradation of the fiber strength. Until now, direct measurements of the stresses exerted on an optical fiber during high-speed processing has not been possible, and, as a result, the stress-time profile of optical fiber has been an assumed quantity.

The ability to collect real-time measurements of the stresses exerted on an optical fiber during processing and cable manufacturing would be valuable for reliability analysis and modeling, process and equipment design, troubleshooting of manufacturing lines, as well as fiber and cable installation.

SUMMARY OF THE INVENTION

One aspect of the present invention is to provide a method and system for measuring stress exerted on an optical fiber including providing an optical fiber that includes a fiber optic sensor, and exposing the optical fiber and the fiber optic sensor to various stresses associated with a process by moving the optical fiber and the fiber optic sensor through the process to be measured. The method and system further include transmitting a source light signal through the optical fiber as the optical fiber and the fiber optic sensor are exposed to the various stresses, receiving a return light signal from the fiber optic sensor as the optical fiber and the fiber optic sensor are exposed to the various stresses, and comparing the source light signal to the return light signal for determining the stresses exerted on the optical fiber.

Another aspect of the present invention is to provide a method and a system for measuring stress exerted on an optical fiber including providing a light source emitting a light having a predetermined frequency, providing a first photo detector coupled to the light source that produces a first electrical signal proportional to the light, providing a first adjustable amplifier coupled to the first photo detector which amplifies a first electrical signal therefrom, and providing the optical sensor coupled to the light source by the optical fiber to transmit at least a portion of the light to the optical sensor. The method and system further includes providing a second photo detector coupled to the optical sensor that detects at least a portion of the light reflected from the optical sensor, and produces a second electrical signal proportional thereto, providing a second adjustable amplifier coupled to the second photo detector that amplifies the second electrical signal therefrom, providing a comparator coupled to the second photo detector that compares the first and second electrical signals to provide a signal representative of the relationship between the first and second signals. In one embodiment, a microcontroller is coupled to the comparator and generates a plurality of trigger signals at a fixed frequency, each initiating a modulated cycle and further that generates a control signal in response to detecting a predetermined transition between the first and second output voltages. The method and system further includes providing a modulator coupled to the light source and the microcontroller to modulate the light source in a periodic manner to provide pulses in response to receiving a trigger signal from the microcontroller. A counter is coupled to the microcontroller and begins counting the periodic pulses in response to receiving a trigger signal, and ends counting in response to receiving a control signal from the microcontroller to generate a count value. The optical fiber and the fiber optic sensor is exposed to various stresses associated with a process by moving the optical fiber and the fiber optic sensor through the process to be measured, and the microcontroller computes the stresses exerted on the optical fiber in response to receiving the count value for each modulation cycle.

Yet another aspect of the present invention is to provide a method for determining the amount of stress exerted on an optical fiber that utilizes a source of light signals, a detector for detecting a return light signal, a comparator for comparing the emitted light signal to the return light signal, and a microcontroller for calculating the stress exerted on the optical fiber. The system includes providing an optical fiber, with a fiber optic sensor. The optical fiber and the fiber optic sensor is exposed to various stresses associated with a process by moving the optical fiber and the associated fiber optic sensors through the process to be measured, while monitoring the detected light signals for calculating the stress exerted on the optical fiber during the process.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
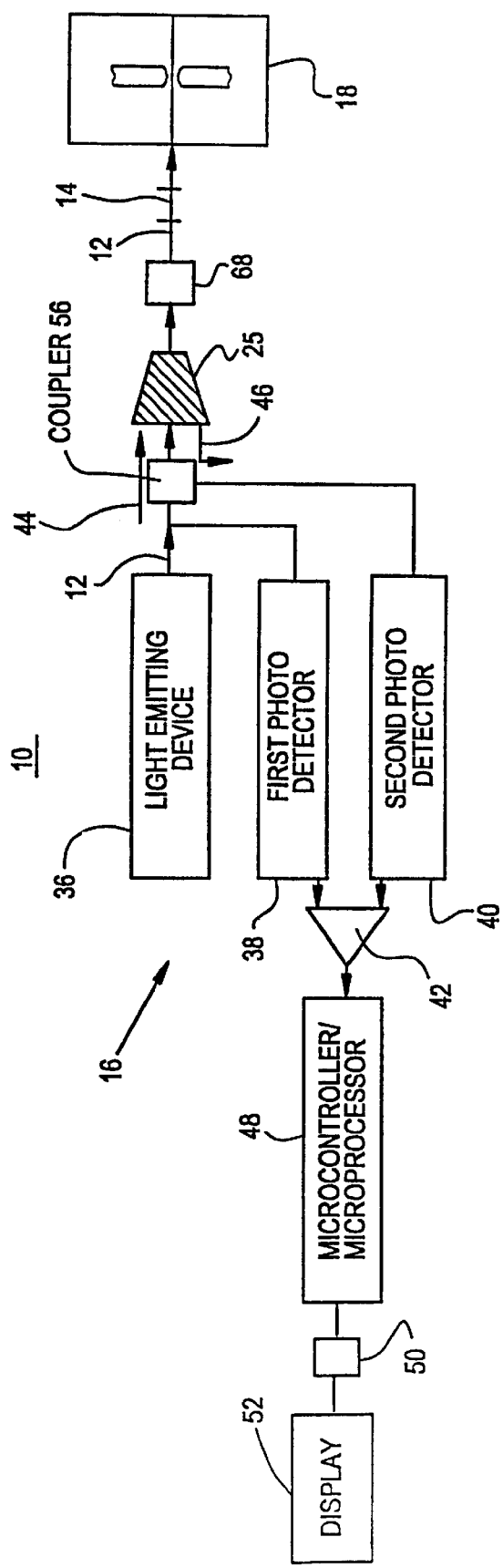
FIG. 1 is a schematic view of a manufacturing process for an optical fiber employing the method and sensing system of the present invention.

In FIG. 1, a sensing system 10 embodying the present invention is employed in the processing of an optical fiber 12 having a fiber optic sensor 14 imbedded therein. An electrical circuit 16 is connected through fiber coupler 56 to optical fiber 12 for monitoring a process, system, or machine 18 treating the optical fiber 12.

The optical fiber 12 can be a single-mode optical fiber that includes a core 20 (FIG. 2), a cladding 22, and a polymeric outer coating 24. A single-mode optical fiber, as designated herein, is optical fiber that propagates only two mutually orthogonal polarization modes of the HE11 mode of light, at a chosen signal wavelength. Further, while a Corning SMF28™ fiber has proven effective, other types and classifications of optical fibers may be used. The optical fiber 12 is preferably provided on a conically-shaped spool 25 (FIG. 1) to allow free, unrestricted unspooling and delivery of the optical fiber 12 into the process or system 18 to be monitored, however, optical fiber 12 can be provided in any form that allows free, unrestricted delivery.

Figure 2:
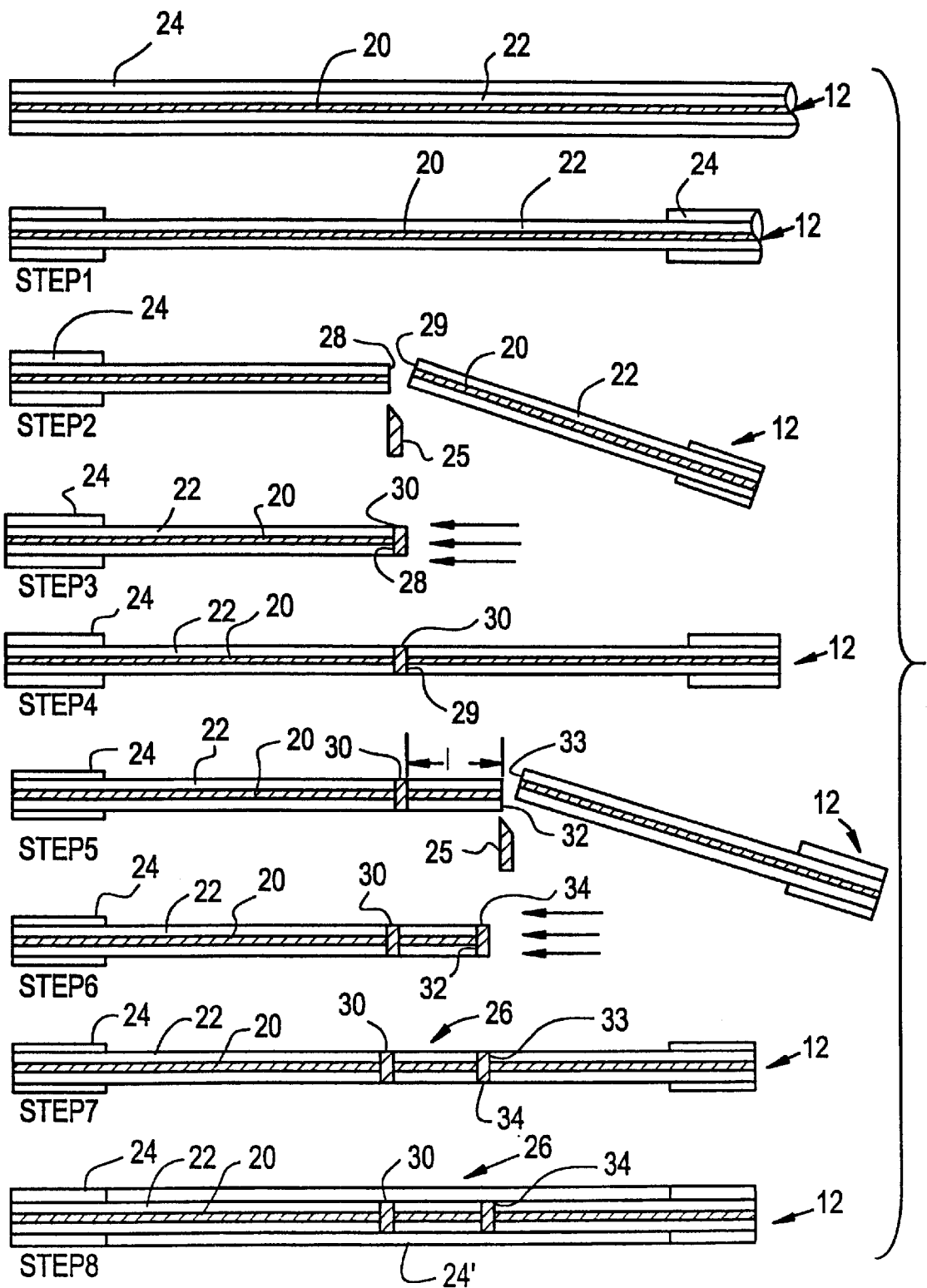
FIG. 2 is multiple cross-sectional views showing an optical fiber and the steps to construct a Fabry-Perot Interferometer.

The most preferred fiber optic sensor 14 utilized in the present invention is a Fabry-Perot Interferometer 26 (FIG. 2). While the most preferred fiber optic sensor 14 is the Fabry-Perot Interferometer 26, the described signal processing system may also be applied to other sensors, such as Michelson and Mach-Zehnder Interferometer sensors. In addition, the optical power can be provided to sensors monitored in transmission as well as in reflection such as in a fiber Bragg gratings, and others as known in the art. The sensing system 10 employs the measurement of the relative phase shift within a Fabry-Perot Interferometer 26. It is assumed that the measurement of interest, the stress exerted on the optical fiber 12 and the embedded Fabry-Perot Interferometer 26, affects the optical phase shift in the Fabry-Perot Interferometer 26 and that the value of the strain is related to the phase shift through a calibration factor. Suitable mathematical computations associated with calculating the phase shift and the strains associated therewith are disclosed, for example, in U.S. Pat. No. 5,557,406.

The Fabry-Perot Interferometer 26 as used in the present system 10 is constructed or disclosed in FIG. 2 by first removing the polymeric outer coating 24 from about a portion of optical fiber 12, as shown in step 1. The optical fiber 12 is then cut forming a first cleaved end 28 and a second cleaved end 29, using, for example, a Fujikura model 30SF splicer 25 as shown in step 2. A first dielectric mirror 30 of titanium dioxide or similar compound is then fabricated by vacuum deposition, or a similar method, on cleaved end 28, as shown in step 3. Second cleaved end 29 is then spliced onto first dielectric mirror 30 by way of electric arc fusion, or a similar method, as shown in step 4. Optical fiber 12 is then re-cut a distance L from first dielectric mirror 30, thereby forming a third cleaved end 32 and a fourth cleaved end 33, as shown in step 5. A second dielectric mirror 34 of titanium dioxide or similar compound is formed on third cleaved end 32, shown in step 6. Fourth cleaved end 33 is then spliced onto second dielectric mirror 34, thereby reforming optical fiber 12 into a continuous length of fiber and forming the Fabry-Perot Interferometer 26 therein, as shown in step 7. Distance L can be formed so as to be between about 0.5 millimeters (mm) and 10 meters. Preferably, distance L is between 5 and 25 millimeters. Most preferably, distance L is approximately 12 millimeters. Optical fiber 12, including interferometer 26 is then re-coated with outer coating 24' along the area from which outer coating 24 was previously removed, as shown in step 8. The adhesion between the dielectric mirrors 30 and 34 and the optical fiber 12 is sufficient to withstand the stresses exerted on the optical fiber 12 and the associated fiber optic sensor 14 as the optical fiber 12 travels through the process or system 18.

As an alternative to dielectric mirrors, Bragg gratings can be used to form the Fabry-Perot cavity. One would write the Bragg gratings at the appropriate spacing, L. In order to achieve broadband reflection encompassing the wavelength of a light signal, for example, from a laser, the gratings would be chirped.

The electrical circuit 16 (FIG. 1) includes a semiconductor laser diode or light emitting device 36 coupled to an end of fiber 12 and which emits a source light signal 44 at a predetermined frequency or set of frequencies. A first photo detector 38 is coupled to source 36 to convert at least a portion of the source light signal 44 into an electrical signal. A second photo detector 40 is coupled through coupler 56 to optical fiber 12 to detect a return light signal 46 and provide a second electrical signal representative thereof. A comparator 42 is coupled to detectors 38 and 40 to compare the first and second electrical signals. Microcontroller 48 is coupled to comparator 42 and analyzes the signal therefrom to calculate the stress being exerted upon the optical fiber 12 and the associated fiber optic sensor 14. Circuit 16 has an output terminal 50 for providing a signal to a data acquisition system 52 such as an oscilloscope or an appropriate processor that allows the operator to monitor the output of the system, in real time. A detailed description of the circuit 16 is now presented with reference to FIG. 3.

Figure 3:
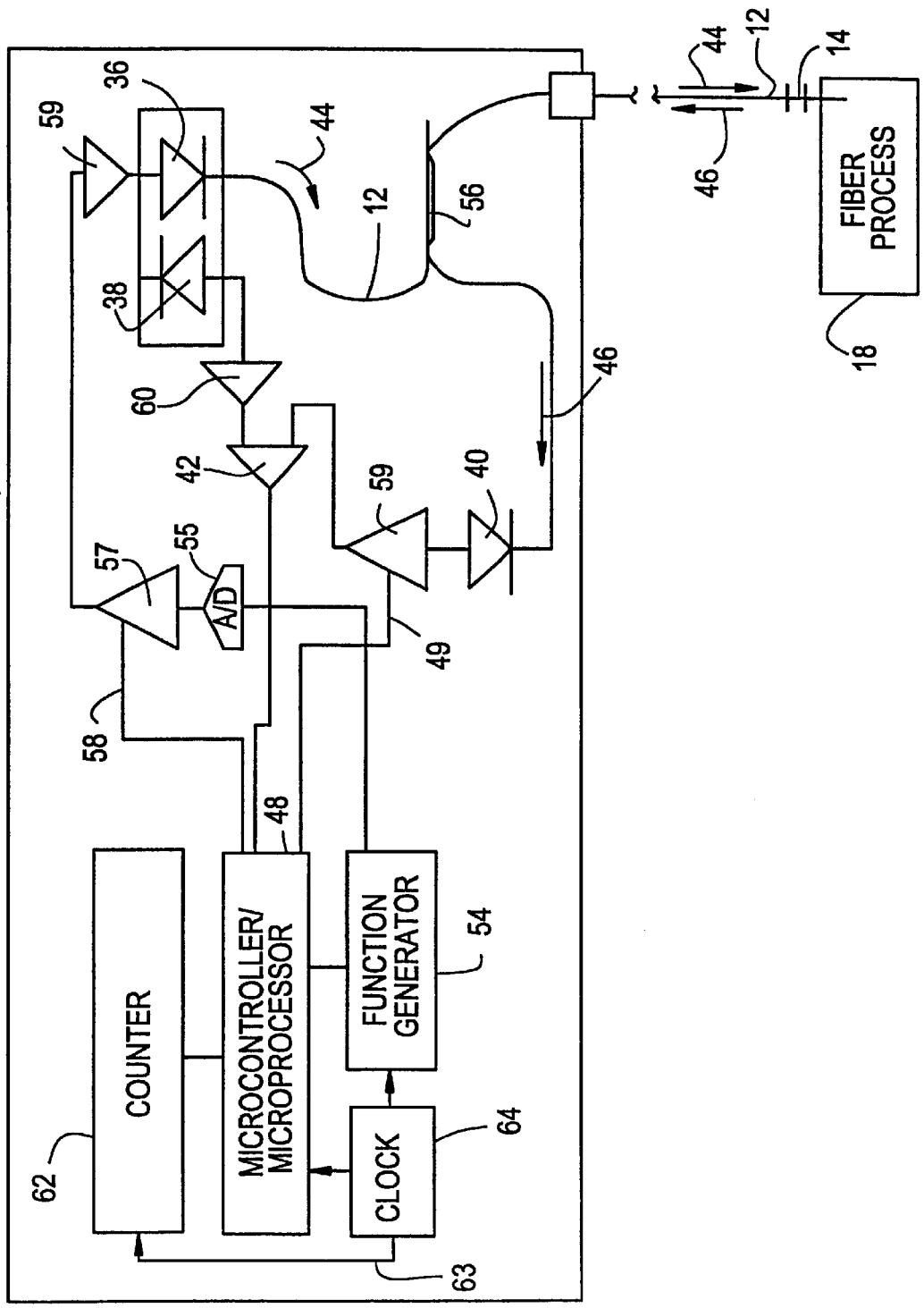
FIG. 3 is an electrical circuit diagram in block and schematic form of the system of the present invention.

In FIG. 3, a system clock 64 generates and sends a clock pulse to a function generator 54 and the microcontroller 48. The function generator 54 produces an appropriate current periodic waveform in response to the clock pulse for modulating the source light signal 44 from the laser diode 36 through a modulation cycle. The signal generated by the function generation 54 is converted to a digital signal by a analog to digital converter 55 and combined with the signal from the microcontroller 48 by a variable gain amplifier 57. The gain of amplifier 57 is controlled by the signal applied to a gain control input from microcontroller 48. The resultant output signal from the amplifier 57 is then coupled to a laser driver amplifier 59, which in turn, provides the source signal to laser diode 36. The first photo detector 38 receives a portion of the laser output power from the laser diode 36 and generates an electrical signal proportional to the optical power received by first photo detector 38. An optical isolator (not shown) may optionally be provided to prevent reflected light from destabilizing the laser output. The light propagated in the optical fiber 12 is then split by a fiber coupler 56 to provide optical power to the fiber optic sensor 14 located upstream of the processing area 18.

A portion of the source light signal 44 is reflected by the fiber optic sensor 14 as a function of stress on the optical fiber 12 creating a return light signal 46 that is routed through the fiber coupler 56 to the second photo detector 40, which converts the return light signal 46 into an electrical signal proportional to the optical energy reflected from the sensor 14.

The electrical signal from the second photo detector 40 serves as the input to a second variable gain operational amplifier 59 which has one or more gain stages controlled by a signal applied to an input terminal 49 from microcontroller 48. The output signal from amplifier 59 is provided as one input to comparator 42. The signal from first photo detector 38 is routed to an operational amplifier 60 which provides an output signal that serves as the other input to the comparator 48. The gain of amplifier 59 is adjusted so that the two comparator input signals cross one or more times during a modulation cycle, so that each time a crossing occurs, the output of the comparator 48 changes from a logic "low" to logic "high" state and vice versa. At the time a modulation cycle begins, a first control signal is sent by the microcontroller 48 to a counter 62 to initiate the counting of clock pulses generated internally or received from the system clock generator 64 via conductor 63. Starting at a preprogrammed time after the beginning of each modulation cycle, the microcontroller 48 monitors the output signal from the comparator 42 to determine when a selected transition occurs in the output signal of the comparator 42. When such a change is identified, the microcontroller 48 sends a second control signal to the counter 62 to stop counting. The accumulated count during the time from the initiation of the cycle to the end of the cycle is then provided to the microcontroller/microprocessor 48, where it is further processed. The microprocessor 48 may process the accumulated count by baseline subtraction to remove common or DC components and then multiplication by a calibration factor as described in the above identified '406 patent to produce a digital output whose value equals that of the stress exerted on the optical fiber 12 at any given time.

As the optical fiber 12 is run through a process or system 18 which places stresses upon optical fiber 12 and the fiber optic sensor 14, physical stress exerted on optical fiber 12 results in a change of length of optical fiber 12 including that section which makes up the fiber optic sensor 14. As discussed above, this change in length results in a relative phase shift of the light signals 44 and 46 within the fiber optic sensor 14 which is converted into a strain reading which, in turn, is then converted into real-time stress readings, thereby allowing for accurate determination of the stress-time profile exerted on the optical fiber.

Sensing system 10 can be used to effectively monitor those processes and systems associated with high speed processing of optical fiber and fiber optic cable manufacturing, as well as the installation of each. These applications of the present sensing system 10 include measuring the unload rate during proof testing of an optical fiber, thereby ensuring that the optical fiber meets industry strength standards and requirements. In addition, sensing system 10 can be used in determining the stress transfer of varying belt and capstan designs, as well as developing stress profiles that occur during coloring, ribboning and stranding processes. Further, sensing system 10 can be used to troubleshoot processes associated with manufacturing fiber optic cables such as finding worn bearings as well as high stress points within the process. The processes as listed above are in no way intended to be limiting on the applicability of the present invention and are provided as merely exemplary applications.

Figure 4:
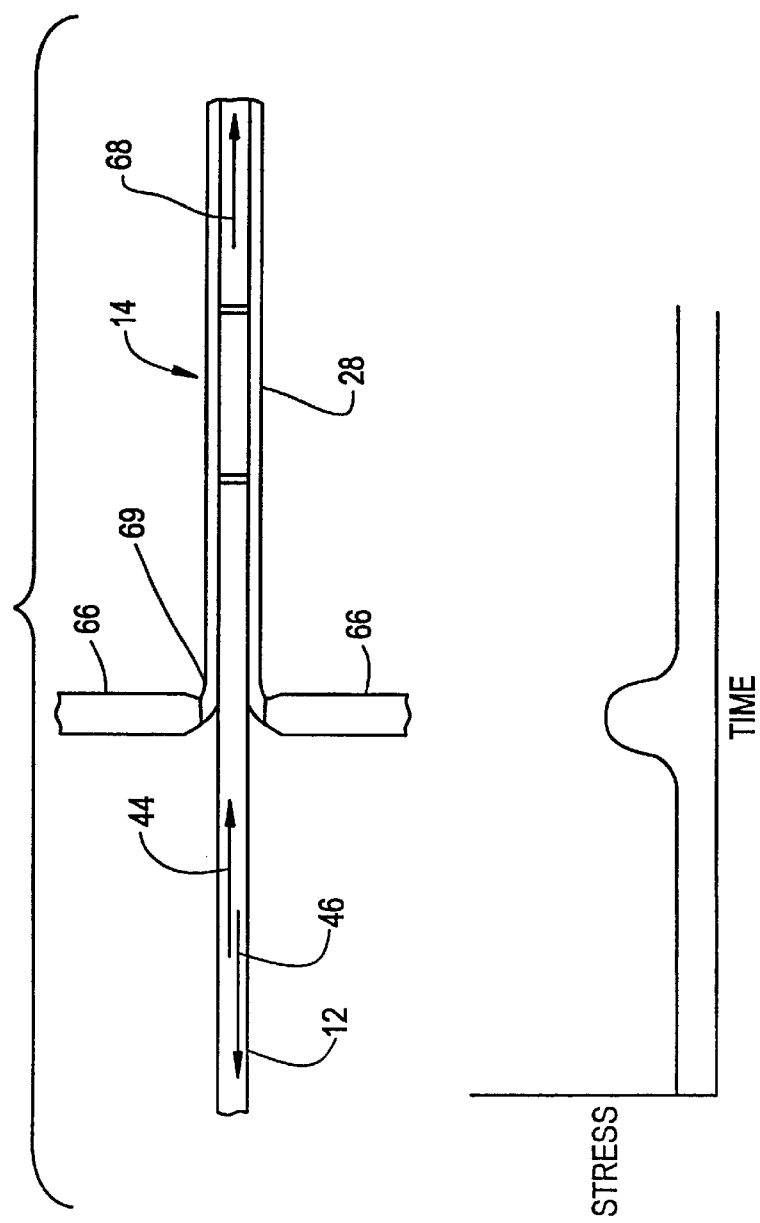
FIG. 4 is a schematic view of a coloring die and a corresponding stress-time graph obtain from the system shown in FIG. 3.

By way of one example, as seen in FIG. 4, the present invention could be used to determine the amount of stress exerted on optical fiber 12 when processed through a coloring die 66. As known in the art, coloring dies are used to apply a colorant 69, usually provided in the form of a UV uncured acrylate, to an optical fiber. As shown in the corresponding graph of FIG. 4, the coloring die 66 exerts a stress on optical fiber 12 due to a frictional force between optical fiber 12 and coloring die 66. As the optical fiber 12 travels in a direction 68 through coloring die 66, the frictional forces acting upon the integral Fabry-Perot Interferometer 26 results in a change in length thereto, thereby allowing for the calculation of the stress exerted on the optical fiber 12 as described above.

The generated stress versus time profile as seen in FIG. 4 and allows for accurate determination of the stress exerted on the optical fiber 12 when it passes through coloring die 66. The stress-time profile can then be used for purposes such as troubleshooting the associated optical fiber production line, optimizing die tension, calculating the stress history of the optical fiber to develop accurate optical fiber strength reliability models, as well as numerous applications.

Figure 5:
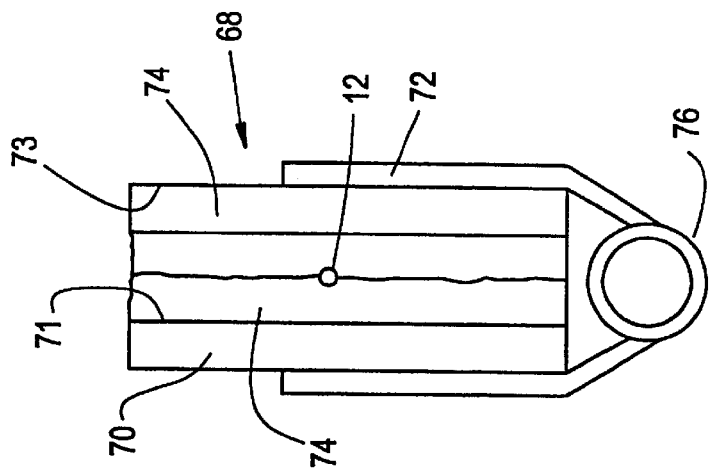
FIG. 5 is a side view of a frictional trigger generator employed in the system of the invention.

Another aspect of the present sensor system 10 is to provide a friction trigger 68 (FIGS. 1 and 5) located at a fixed position relative to the movement of the optical fiber 12 as optical fiber 12 travels through the process or machine 18 to be monitored. Friction trigger 68 includes a first body 70 having an inner face 71, and an opposed second body 72 having an inner face 73. A cloth cover 74 is secured to inner face 71 of first body 70 and to the inner face 73 of the second body 72. A compression spring 76 holds the cloth covers 74 secured to the first body 72 and second body 74 in close contact. In operation, frictional trigger 68 is positioned about optical fiber 12 (extending into and out of the place of drawing FIG. 5) so as to provide a slight frictional force therebetween. When the fiber optic sensor 14 passes through friction trigger 68 a slight increase in the stress exerted on the optical fiber 12 occurs, thereby providing the user with a point in time from which to begin reading the stress forces as encountered by fiber optic sensor 14 as it travels through process or machine 18. By knowing the location of the friction trigger, the speed which the optical fiber 12 travels through the process or machine 18, and the distance between the components within the process or machine 18 that will exert a stress on the fiber optic sensor 14, the operator can determine the stress exerted on the optical fiber 12 by each component of the process or machine 18. The description of the frictional trigger 68 as provided above is in no way intended to limit the configuration of the trigger device or its function in the process.

It will be apparent to those skilled in the art that various modifications and adaptations can be made to the present invention without departing from the spirit and scope of this invention. Thus, it is intended that the present invention, provided they come within the scope of the appended claims and their equivalents.

The invention claimed is:

1. A method for measuring stress exerted on an optical fiber, comprising:

providing an optical fiber that includes a fiber optic sensor;

exposing the optical fiber and the fiber optic sensor to various stresses associated with a process by moving the optical fiber and the fiber optic sensor through the process to be measured, wherein said optical fiber and fiber optic sensor enter and exit the process to be measured;

transmitting a source light signal through the optical fiber as the optical fiber and the fiber optic sensor are exposed to the various stresses;

receiving a return light signal from the fiber optic sensor as the optical fiber and the fiber optic sensor are exposed to the various stresses; and comparing the source light signal to the return light signal for determining the stress exerted on the optical fiber.

2. The method described in claim 1, wherein the step of providing an optical sensor includes providing an optical fiber interferometer.

3. The method described in claim 2, wherein the step of providing an optical fiber includes providing a Fabry-Perot Interferometer.

4. The method described in claim 1, wherein the fiber optic sensor is a fiber Bragg grating.

5. The method described in claim 1, wherein the step of exposing the optical fiber to various stresses includes moving the optical fiber through a process associated with the manufacture of optical fibers.

6. The method described in claim 1, wherein the step of exposing the optical fiber to various stresses includes moving the optical fiber through processes associated with the manufacture of fiber optic cables.

7. The method described in claim 1, wherein the step of providing an optical fiber includes providing the optical fiber on a conically shaped spool.

8. The method described in claim 1, further including:

providing a friction trigger positioned such that the fiber optic sensor will encounter the frictional trigger prior to exposing the fiber optic sensor to the various stresses.

9. A method for determining the amount of stress exerted on a optical fiber, utilizing an apparatus capable of emitting a light signal, receiving a return light signal, comparing the emitted light signal to the return light signal, and calculating the stress exerted on the optical fiber, wherein the method includes:

providing an optical fiber;

providing a fiber optic sensor within the optical fiber;

exposing the optical fiber and the fiber optic sensor to various stresses associated with a process by moving the optical fiber and the associated fiber optic sensor through the process to be measured, wherein said optical fiber and fiber optic sensor enter and exit the process to be measured;

monitoring the forces exerted on the optical fiber and the fiber optic sensor during the process; and calculating the stress exerted on the optical fiber during the process.

10. The method of in claim 9, wherein the step of providing a fiber optic sensor includes providing an optical fiber interferometer.

11. The method of claim 10, wherein the step of providing a fiber optic sensor includes providing a Fabry-Perot Interferometer.

12. The method of claim 9 further including:

exposing the fiber optic sensor to a friction trigger prior to exposing the fiber optic sensor to the various stresses.

* * * * *